Figure 3:
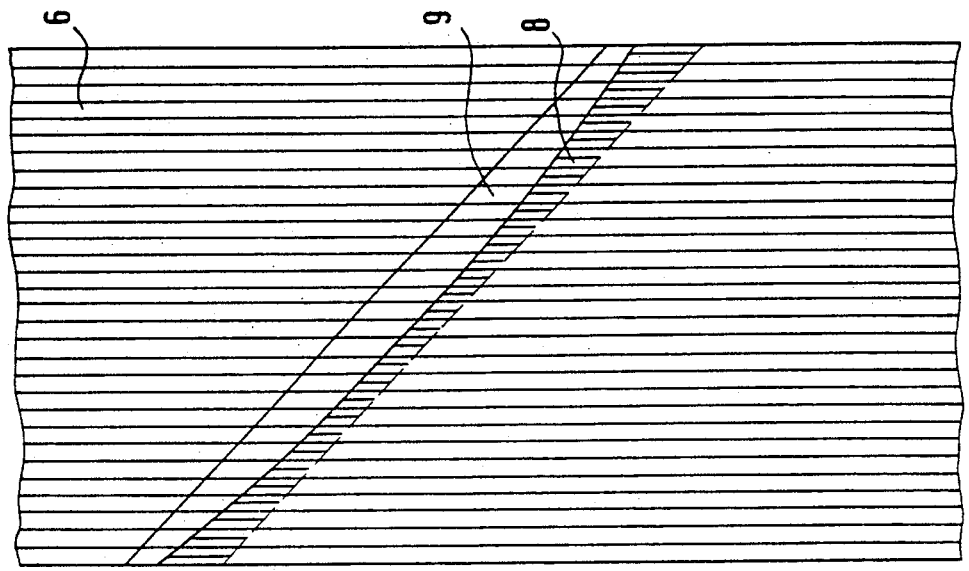

United States Patent [19]

Lukosch et al.

[11] Patent Number: 5,117,887
[45] Date of Patent: Jun. 2, 1992

[54] RADIAL TIRE AND A METHOD OF BUILDING THE SAME

[75] Inventors: Rudolf Lukosch, Wittlich; Hans-Joachim Winter, Gelnhausen, both of Fed. Rep. of Germany

[73] Assignee: SP Reifenwerke GmbH, Hanau, Fed. Rep. of Germany

[21] Appl. No.: 388,784

[22] Filed: Aug. 2, 1989

[30] Foreign Application Priority Data

Aug. 4, 1988 [DE] Fed. Rep. of Germany ....... 3826587

[51] Int. Cl.⁵ .................................................. B60C 9/28
[52] U.S. Cl. ..................... 152/538; 152/533; 152/527; 156/134
[58] Field of Search ............... 152/526, 532, 533, 538, 152/530, 527; 156/130, 134, 126

[56] References Cited

U.S. PATENT DOCUMENTS

| | | |
|---|---|---|
| 2,982,328 | 5/1961 | Emanueli et al. ................... 152/527 |
| 3,503,432 | 3/1970 | Maiocchi . |
| 3,559,714 | 2/1971 | Verdier . |
| 3,786,851 | 1/1974 | Mirtain et al. ....................... 152/527 |
| 4,140,168 | 2/1979 | Caretta ................................ 152/527 |
| 4,146,415 | 3/1979 | Caretta et al. . |
| 4,183,391 | 1/1980 | Romand .............................. 152/538 |
| 4,325,423 | 4/1982 | Seitz et al. .......................... 152/526 |
| 4,407,347 | 10/1983 | Mirtain .............................. 152/527 |
| 4,445,560 | 5/1984 | Musy . |
| 4,807,681 | 2/1989 | Kadota ............................... 152/538 |
| 4,865,102 | 9/1989 | Saneto et al. . |

Primary Examiner—Michael W. Ball
Assistant Examiner—Francis J. Lorin
Attorney, Agent, or Firm—Townsend and Townsend

[57] ABSTRACT

A radial tire is described having at least one band which extends in the circumferential direction of the tire and which at least regionally surrounds a breaker arrangement, with the ends of the band overlapping each other, in which the band consists of several individual strips the length of which is preferably so selected that the length of the overlap of the individual strip ends in the finished tire is at least substantially the same.

23 Claims, 4 Drawing Sheets

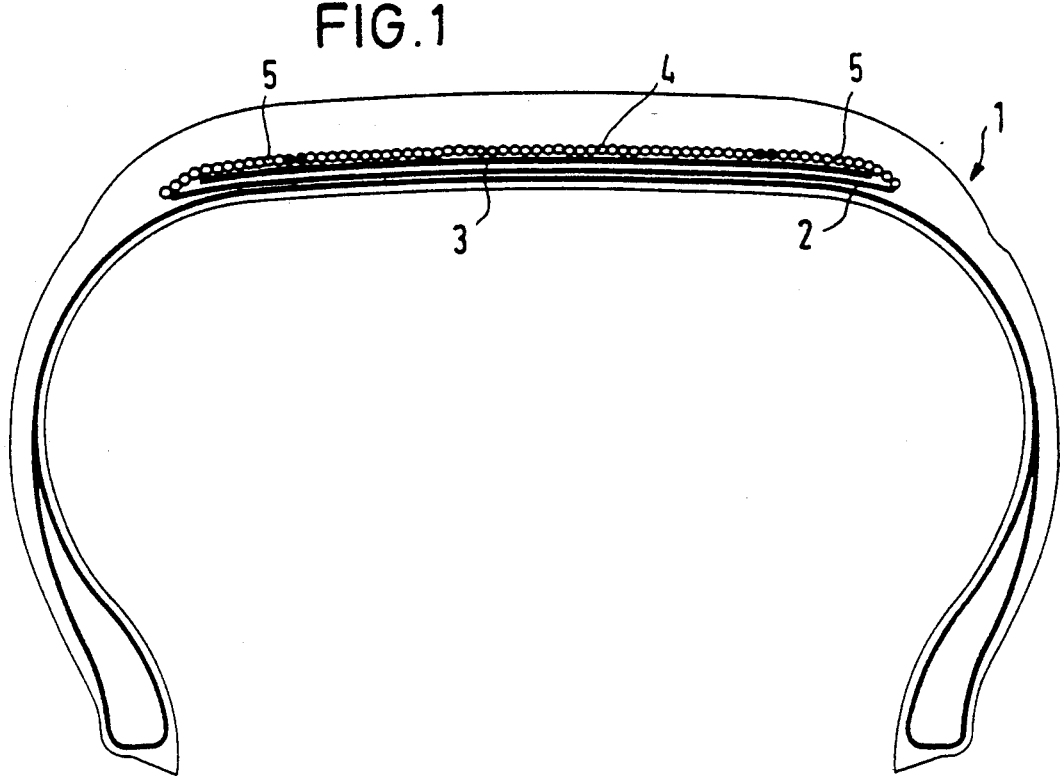
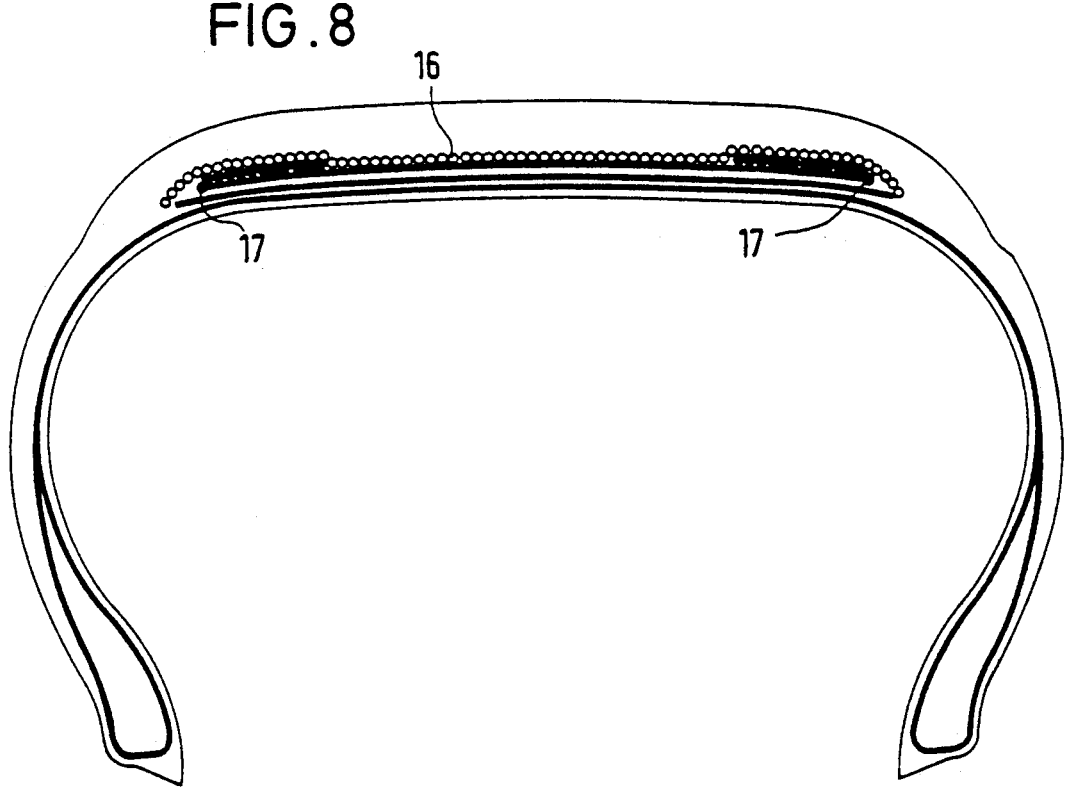

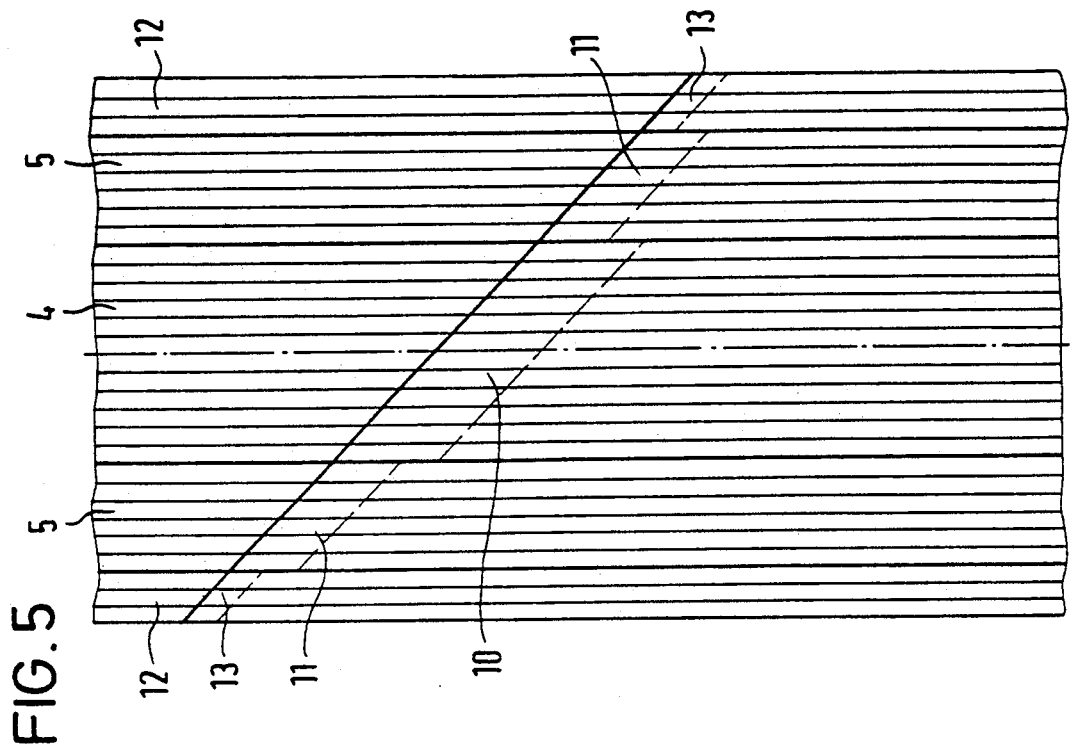
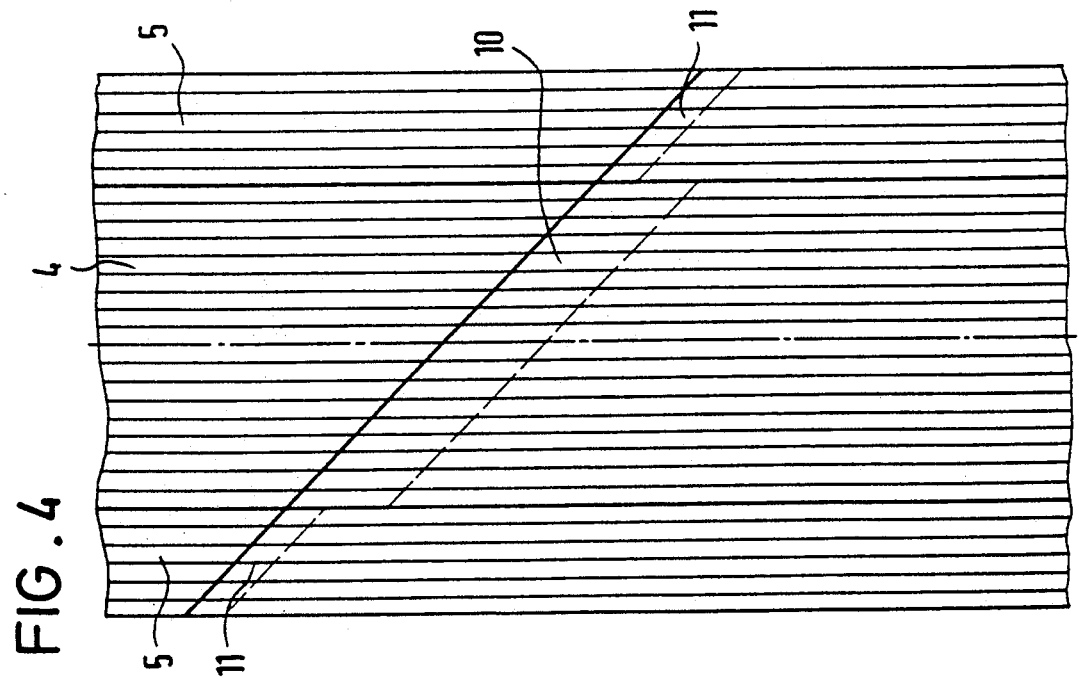

RADIAL TIRE AND A METHOD OF BUILDING THE SAME

The invention relates to radial tyre having at least one band extending in the circumferential direction of the tyre, with the band engaging at least regionally around a breaker arrangement consisting in particular of crossed steel cord plies, and with the band being overlapped at its ends; and also to a method of building a radial tyre of this kind.

The band used with radial tyres of this kind, which normally consists of nylon material extending at zero degrees, i.e. in the circumferential direction, has above all the purpose of counteracting the centripetal forces which occur in the tyre at high speeds and thus of preventing any tendency of the plies to separate, in particular in the region of the edges of the breaker.

Depending on the particular speed requirements such nylon bands are applied in the form of one winding, or in the form of several windings, and it is also already known to provide a band in strip form, especially in the region of the edges of the breaker, in order to achieve the required strength and reliability in these particularly critical tyre regions.

While the breaker plies, in particular when dealing with steel breaker plies, can generally be put together in a butted arrangement during the building of the tyre on flat building drums, one normally operates with bands, which are customarily cut to length at an angle 90° to 10°, with overlap lengths of 10 mm to 35 mm.

Since a ply construction or breaker assembly which is manufactured on a flat building drum is shaped in the vulcanizing mould extensions and compressions occur in the breaker construction, with the breaker experiencing the most pronounced compression in the shoulder region, i.e. in the region of the largest loads.

As a consequence of these changes which occur in the breaker assembly, rolling noise in the form of knocking effects or vibrations can result in the finished tyre at specific speeds, and moreover irregular local abrasion can occur.

It is already known to counter these undesired effects by the use of nylon which shrinks pronouncedly at elevated temperatures, however this procedure brings the disadvantages that a more pronounced flat spot formation occurs, i.e. a pronounced flattening of the tyre during stationary phases and cooling phases.

The object underlying the invention is to form a radial tyre of the initially named kind in such a way that the above indicated problems no longer occur and thus that a radial tyre suitable for high speeds and for the highest speeds is available in which the danger of knocking noises, vibrations caused by imbalance, and flat spot formation is at least extensively and preferably fully overcome.

In order to satisfy this object provision is made, in accordance with a first variant of the invention, that the band comprises three individual strips which are arranged alongside one another and which together at least partially cover the breaker region.

With the kind of band construction, which in particular overcomes the flat spot formation, a double strip band is preferably applied in the centre or crown region and edge strips which are broader in comparison thereto are likewise wound on double. One can proceed in such a way that after the application of the central strip band the bells are drawn away, the steel breaker is rolled down and the edge strips are then wound on, however the bells could also be left in position after the application of the central strip, i.e. are not drawn away, whereupon the edge strips are wound on double, the tread is laid on and rolled down and finally the bells are withdrawn.

Having regard to overcoming the occurrence of rolling noises, in particular in the form of knocking effects at certains speeds, the invention provides in particular that the length of the individual strips is selected such that the length of overlap of the individual strips in the finished tyre is at least substantially the same.

As a result of the extensions and compressions in the breaker assembly which occur from the zenith to the shoulder in the vulcanizing mould one obtains, with a customary construction of a tyre having initially uniformly overlapped bands, different lengths of overlap in the finished tyre, i.e. there is a smaller overlap in the crown region than in the shoulder region, and indeed this overlap can be cancelled in the crown region depending on the originally selected overlap, whereas the band is still overlapped in the shoulder regions. In the case of a band extending over the full width of the breaker the boundary of the overlap region in the finished tyre generally has a circular arc shape, i.e. an overlap length which increases from the centre of the tyre outwardly.

Through the defined choice of the length of the individual strips effected in accordance with the invention one succeeds in avoiding these different lengths of overlap in the finished tyre and in ensuring that a defined and uniform overlap length is present in the finished tyre when seen over the width of the tyre, since the different extension conditions which necessarily result through the mould contour can be compensated for by the different lengths of the individual strips. The initial lengths of the individual strips at the time of application to the breaker arrangement preferably differ in part, with the specific lengths of the individual strips being selected in dependence on the known extension conditions which prevail in the vulcanization mould.

The individual strips can be arranged both substantially adjoining one another and also mutually spaced from one another in the tyre depending on the precise requirements, however the individual strip ends always form a band overlapping zone in the form of a continuous or interrupted strip with parallel boundary lines extending over the width of the band.

In accordance with a further embodiment of the invention the overlap regions of the individual strip ends, the lengths of which relative to each other are at least substantially the same in the finished tyre, are mutually displaced in the circumferential tyre direction and lie at least in part diametrically opposite one another, so that imbalance effects in the tyre are minimized or precluded as result of the construction.

In accordance with a further embodiment of the invention the direction of overlap of the individual strips is selected to differ, at least in part.

A further substantial advantage of the invention which results from the use of individual strips lies in the fact that these individual strips, and one or more optionally present band or bands which extend ove the width of the tyre, can consist at least in part of different materials.

Thus it is possible to use nylon which shrinks to a higher degree, for example in the individual strips which are disposed in the shoulder region, while in the crown region customary nylon material is used, so that advantages can be achieved in the shoulder region with respect to the high speed characteristics without the occurrence of flat spot effects having to be tolerated in the remaining tyre region.

A first variant of a method of building a radial tyre in accordance with the invention is characterized in that in a first stage the crossing breaker plies, in particular steel breaker plies, are applied to cylindrical building drum and, after consolidation, shaping is effected in correspondence with the course of the associated mould contour, and in that the individual strips of the band or bands are then applied.

In this case the individual strips have different lengths in dependence of their positioning, so that the required uniform overlap length of all individual strips is obtained by appropriate dimensioning.

In accordance with a second embodiment the building of a radial tyre in accordance with the invention takes place in such a way that in a first stage the crossing breaker plies, in particular steel breaker plies, are applied to a cylindrical building drum; that the individual strip or strips associated with the crown region are then arranged on the breaker region and shaping is then effected in correspondence with the course of the associated mould contour; and that the individual strips of the band or bands associated with the shoulder regions are then applied.

Through this procedure a further optimization can be obtained which leads to angular distortion to being minimized and to more constant dimensions being obtained in the breaker and in the tread region, so that an improvement of the tyre uniformity results.

Further particularly advantages embodiments of the invention are set forth in the subordinate claims.

Figure 2:
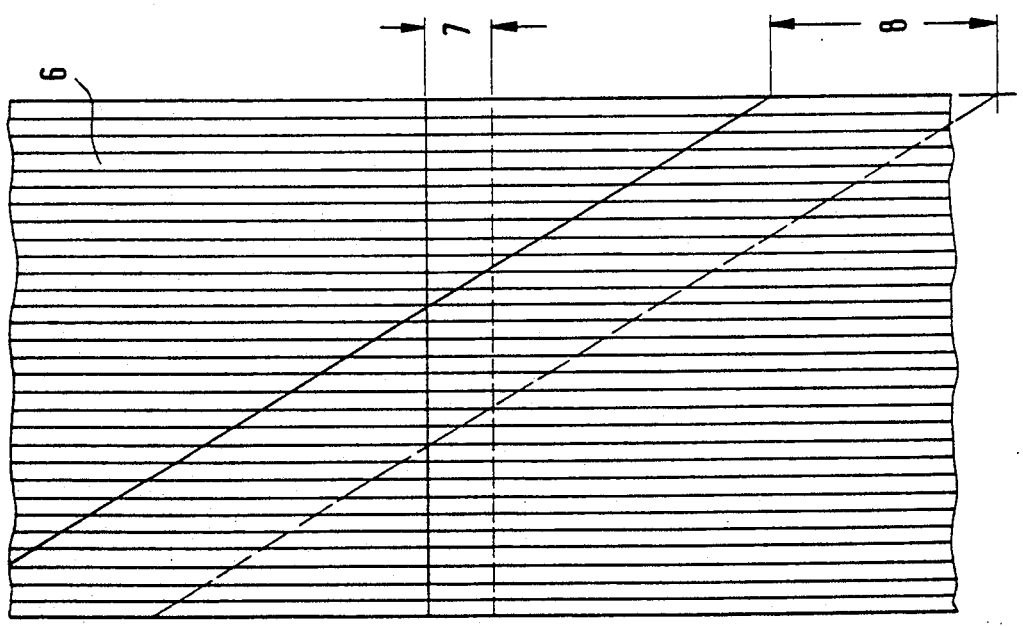

The invention will now be explained in the following by way of example and with reference to the drawing in which are shown:

FIG. 1 a shematic cross-sectional representation of a radial tyre in accordance with the invention, FIG. 2 a schematic plan view of a customary zero degree band at the time of application to the breaker, FIG. 3 the band of FIG. 2 in the finished tyre.

Figure 6:
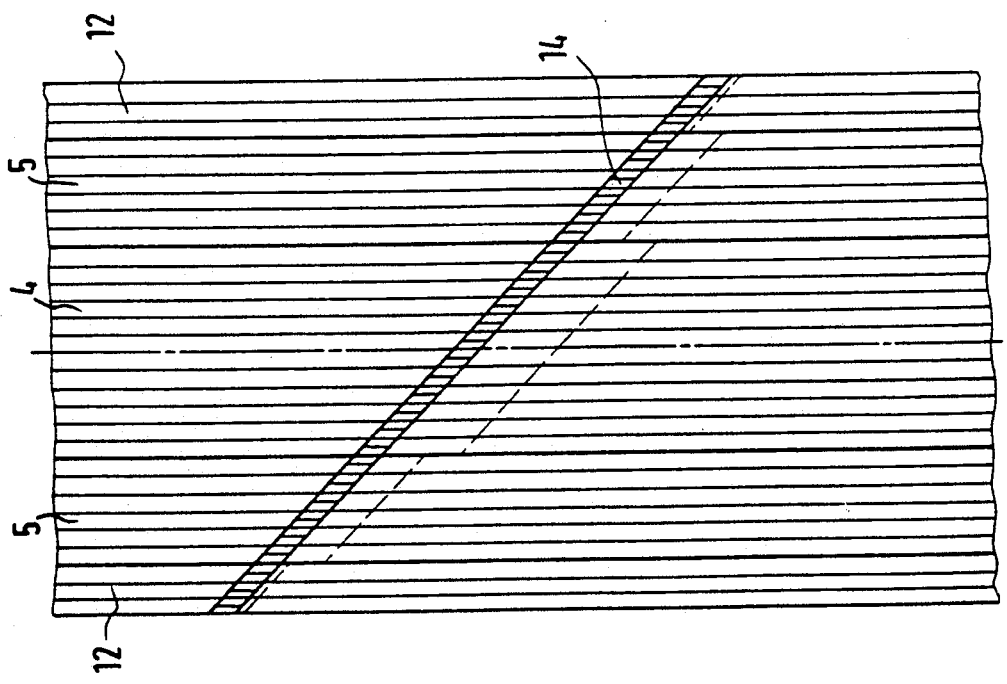
Figure 7:
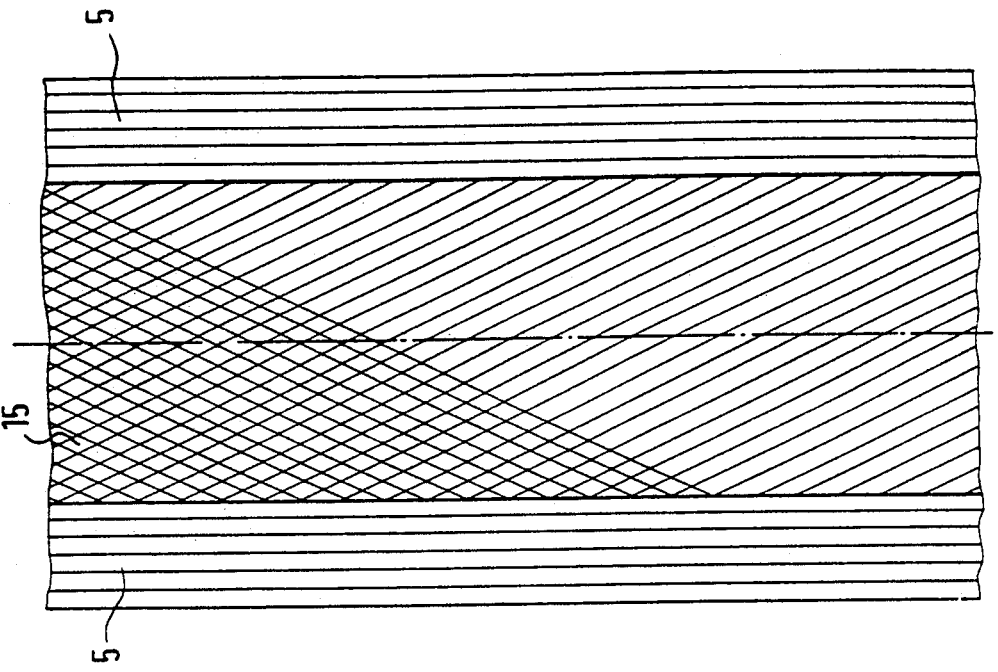

FIG. 4 a representation corresponding to FIG. 2 of a band in accordance with the invention, FIG. 5 a further lay-out of a band arrangement in accordance with the invention after it has been applied to the breaker, FIG. 6 the band arrangement of FIG. 5 in the finished tyre, FIG. 7 a further variant of a band arrangement in accordance with the invention, FIG. 8 a cross-sectional view of a radial tyre in accordance with a further embodiment of the invention.

FIG. 1 shows a radial tyre 1 having a breaker arrangement comprising two crossed plies 2, 3 and a zero degree band which surrounds this breaker arrangement, in particular a nylon band which comprises a strip 4 which covers over the central region and two strips 5 which cover the region of the breaker edges.

In place of a single ply construction of the strip bands one can also provide a two or multi-ply arrangement, and in particular it is possible to use different materials for the different strips 4, 5 in order to take account of the special requirements in the centre regions of the tyre and in the breaker edge region.

Whereas with customary bands which surround the breaker arrangement a one-piece band was used which extended over the full width of the breaker, the band of the invention is made in several parts—considered across the width of the tyre.

FIG. 2 shows a customary one-piece band 6 which as a rule is cut to length at an angle of 90° to 30° and which, depending on the shrinkage behaviour is overlapped with different lengths, for example in the region from 10 mm to 35 mm, so that an overlapping region 7 which extends in the transverse direction, or an obliquely extending overlapping region 8 results.

As the mould contour is composed of different radii whereas the breaker assembly is customarily built up flat, the breaker assembly is subjected in the vulcanization mould, going from the zenith to the shoulder, to extensions and compressions, with the largest compressions occuring in the shoulder region of the breaker, i.e. in the region of the greatest loads.

FIG. 3 shows the band 6 of FIG. 2 in the finished tyre, i.e. after the vulcanization which leads to extensions and compressions in the breaker assembly. As a consequence of these effects there is a change of the original overlapping region 8 of constant length in such a way that a boundary edge of this region extends in the manner of a circular arc and thus a new overlapping region 9 is created, which has a lesser width in the region of the centre of the type and increases towards the tyre shoulders.

In order to ensure that an overlap is still always present in the finished tyre in the region of the tyre middle, and that no open position occurs, the original overlap must be made relatively large.

The non-uniform overlap considered over the width of the tyre, and in particular the occurrence of a broad overlap in the shoulder region leads, in particular at different speeds, to knocking effects which negatively influence the comfort of the tyre.

FIG. 4 shows a band arrangement in accordance with the invention which makes it possible to overcome the above indicated problems.

This band comprises a central strip 4 and two lateral band strips 5 associated with the breaker edges, and in this embodiment the strips preferably directly adjoin one another.

By dividing the band into individual strips and through selecting different lengths or application dimensions one succeeds in achieving a match to the extension conditions which originate from the respective mould contour. By selecting overlapping regions 10, 11 of different lengths when applying the band strips it is ensured that a uniform overlap length results in the finished tire considered over the width of the tyre.

FIG. 5 shows a variant of a band which, in addition to the three strips shown in FIG. 4, has further band strips 12, with it being shown that the number of strips to be used depends in particular on the curvature of the tread surface contour, and indeed taking account of the total width of the respective breaker. In this case three different overlap lengths 10, 11, 13 are present between the ends of the respective band strips 4, 5, 12, with the overlap length reducing from the middle of the tire outwardly.

FIG. 6 shows the band arrangement of FIG. 5 in the finished tire and a uniform overlap 14 of constant width has arisen from the original overlap lengths which are still indicated in broken lines.

In practice the band concept of the invention can be realized without difficulties, since after applying the strips with different laying steps the one or two-fold winding process can take place and all strips can be cut to length at an angle of 90° to 10° in one working process.

FIG. 7 shows a variant of a band arrangement in which zero-degree band strips 5 are associated with the breaker edge regions, while in the crown region a crossed assembly 15 or also a band with filaments running at angle to the central plane of the tyre can be used.

These arrangements make it possible, in particular with the selection of the respectively best-suited materials, to improve both the high-speed characteristics of a tyre and also the flat spot danger, so that the riding comfort and the handling characteristics are advantageously influenced.

FIG. 8 shows a cross-sectional view of a radial tire in which strip-like bands 17 are provided in the region of the breaker edges and the entire breaker and also these strip bands are surrounded by a band 16 which surrounds the breaker throughout. The strip-like bands 17, which can consist of single or multiple plies can be disposed both radially inside and also radially outside of the complete band, and it is also possible to allow the complete band to engage in the manner of a sandwich between strip bands, and indeed in place of single complete band 16 one can also use several such complete bands.

Of particular significance with this combination of strip bands and complete bands is the selection of the different materials, in particular nylon materials, for the complete band and for the strip bands, since the tyre characteristics can be influenced in particularly favourable manner by these combinations in dependence on the respectively prevailing requirements.

We claim:

1. A radial tire having a crown region and a shoulder region, the tire comprising at least one band extending in the circumferential direction of the tire, the band having overlapped ends and engaging at least regionally around a breaker arrangement comprising crossed steel cord piles, wherein the band consists of at least three individual strips which are arranged alongside one another across the crown region and the shoulder region, and which together at least partially cover the breaker arrangement, the initial length of the individual strips at the time of application to the breaker arrangement being selected such that the length of the overlap of the individual strip ends is at least substantially the same in the finished tire and at least two of the strips having different initial lengths.

2. A radial tire in accordance with claim 1, wherein the individual strips associated with the crown region and the individual strips associated with the shoulder regions are wound on double.

3. A radial tire in accordance with claim 1, wherein the individual strips are arranged at least substantially adjoining one another.

4. A radial tire in accordance with claim 1, wherein the individual strip ends are disposed alongside one another and together form a band overlapping zone in the form of a continuous or interrupted strip, which extends over the width of the band, with the boundary lines of each strip being parallel to one another.

5. A radial tire in accordance with claim 1, wherein the overlapping regions of the individual strip ends are mutually displaced in the circumferential direction of the tire.

6. A radial tire in accordance with claim 5, wherein the overlapping regions of the individual strip ends are disposed diametrically opposite to one another, at least in part.

7. A radial tire in accordance with claim 6, wherein the diametrically oppositely disposed overlapping regions of the individual strip ends are of differing size, the sum of the overlapping areas of the respective oppositely disposed overlapping regions being at least substantially the same.

8. A radial tire in accordance with claim 1, wherein the overlapping regions of individual strips disposed above one another are mutually displaced and are uniformly distributed over the tire circumference.

9. A radial tire in accordance with claim 1, wherein the direction of overlap of the individual strips differs, at least in part.

10. A radial tire in accordance with claim 1, wherein the number of individual strips forming the band is increased with increasing tire width or curvature of the thread contour.

11. A radial tire in accordance with claim 1, wherein the individual strips are respectively cut to length at an angle of 90° to 10° relative to the central peripheral plane.

12. A radial tire in accordance with claim 1, wherein the individual strips consist at least in part of different material.

13. A radial tire in accordance with claim 1, wherein the individual strips consist of different nylon materials.

14. A radial tire in accordance with claim 13, wherein the individual strips consist at least in part of shrinkable nylon material.

15. A radial tire in accordance with claim 14, wherein the individual strips consist at least in part of differently shrinking nylon material.

16. A radial tire in accordance with claim 1, wherein the individual strips disposed on the shoulder region consist of nylon with a higher degree of shrinkage than the nylon of the individual strips disposed on the crown region.

17. A radial tire in accordance with claim 1, wherein the individual strips of nylon are arranged at 0° degrees in the shoulder regions and individual strips are arranged therebetween, and wherein the strips in the crown region are arranged at an angle of about 10° to 80° as a single coil or as a crossed assembly (5).

18. A radial tire in accordance with claim 1, wherein the individual strips comprise a reinforcement material, selected from the group consisting of textile fiber, glass fibre, steel fibre, and corresponding tape.

19. A radial tire in accordance with claim 1, wherein individual strips of the same material are arranged above one another in the shoulder regions and in the crown region in the form of individual plies or continuous multiple plies.

20. A radial tire in accordance with claim 1, wherein individual strips of at least partially differing material are arranged above one another in the shoulder regions and in the crown region in the form of the individual plies or continuous multiple plies.

21. A radial tire in accordance with claim 1, wherein the individual strips are combined with at least one complete band extending over the breaker width with different materials being used for the individual strips and for the complete band.

22. A radial tire in accordance with claim 1, wherein a strip free region of predeterminable width is provided between the individual strips in the crown region and the individual strips in the shoulder region.

23. A radial tire having a crown region and a shoulder region, the tire comprising at least one band extending in the circumferential direction of the tire, the band having overlapped ends and engaging at least regionally around a breaker arrangement comprising crossed steel cord piles, wherein the band consists of at least three individual strips which are cut along straight lines and are arranged alongside one another across the crown region and the shoulder region, and which together at least partially cover the breaker arrangement, the initial length of the individual strips at the time of application to the breaker arrangement being selected such that the length of the overlap of the individual strip ends is at least substantially the same in the finished tire and at least two strips having different initial lengths.

* * * * *